United States Patent
Godager

(10) Patent No.: US 9,899,129 B2
(45) Date of Patent: Feb. 20, 2018

(54) TUBULAR ELECTRIC CABLE FITTINGS WITH STRAIN RELIEF

(75) Inventor: Oivind Godager, Sandefjord (NO)

(73) Assignee: Sensor Development AS, Sandefjord (NO)

( * ) Notice: Subject to any disclaimer, the term of this patent is extended or adjusted under 35 U.S.C. 154(b) by 161 days.

(21) Appl. No.: 14/003,744

(22) PCT Filed: Mar. 7, 2012

(86) PCT No.: PCT/GB2012/000222
§ 371 (c)(1),
(2), (4) Date: Nov. 13, 2013

(87) PCT Pub. No.: WO2012/120258
PCT Pub. Date: Sep. 13, 2012

(65) Prior Publication Data
US 2014/0151088 A1 Jun. 5, 2014

(30) Foreign Application Priority Data
Mar. 10, 2011 (GB) .................... 1104115.9

(51) Int. Cl.
*H01R 4/00* (2006.01)
*H01B 17/02* (2006.01)
*G02B 6/44* (2006.01)
*H01R 13/58* (2006.01)
*H02G 15/007* (2006.01)

(52) U.S. Cl.
CPC .......... *H01B 17/02* (2013.01); *G02B 6/4471* (2013.01); *H01R 13/5833* (2013.01); *H02G 15/007* (2013.01)

(58) Field of Classification Search
CPC ...... H01R 4/70; H01R 4/723; H01R 13/5833; H02G 15/003; H02G 15/007; H01B 17/02; G02B 6/4471
USPC ........................................ 174/84 R
See application file for complete search history.

(56) References Cited

U.S. PATENT DOCUMENTS

| | | | |
|---|---|---|---|
| 4,205,899 A | 6/1980 | King et al. | |
| 4,992,629 A | 2/1991 | Morais | |
| 5,519,171 A | 5/1996 | Vester | |
| 6,179,269 B1 * | 1/2001 | Kobylinski | 254/134.3 R |
| 6,653,568 B1 * | 11/2003 | Davis | H02G 3/0481 |
| | | | 174/135 |
| 6,908,673 B2 * | 6/2005 | Castellani | H01B 3/22 |
| | | | 174/110 PM |
| 7,570,862 B2 | 8/2009 | Kerry et al. | |
| 7,676,132 B1 * | 3/2010 | Mandry | G02B 6/4478 |
| | | | 385/134 |
| 7,680,544 B1 * | 3/2010 | Conger | 607/122 |
| 7,720,067 B2 | 5/2010 | Nakagawa | |
| 2004/0005123 A1 | 1/2004 | Seo et al. | |

(Continued)

FOREIGN PATENT DOCUMENTS

| | | |
|---|---|---|
| EP | 0394618 | 10/1990 |
| GB | 1510815 | 5/1978 |

(Continued)

*Primary Examiner* — Pete Lee
(74) *Attorney, Agent, or Firm* — Haynes & Boone LLP

(57) ABSTRACT

A tubular cable fitting which is capable of providing strain relief for Tubular Electric Cables ("TEC") and is designed to protect end fittings from loss of circuit continuity. The TEC end fittings may be of fiber optic or electric type service.

12 Claims, 5 Drawing Sheets

(56) References Cited

U.S. PATENT DOCUMENTS

| | | | |
|---|---|---|---|
| 2005/0034891 A1* | 2/2005 | Ekeberg | H01B 7/14 174/113 R |
| 2006/0041293 A1* | 2/2006 | Mehdizadeh | A61N 1/056 607/116 |
| 2010/0193220 A1 | 8/2010 | Prasad et al. | |
| 2010/0220969 A1* | 9/2010 | Utz | G02B 6/4471 385/136 |

FOREIGN PATENT DOCUMENTS

| | | |
|---|---|---|
| GB | 2089520 | 6/1982 |
| NL | 1002900 | 10/1997 |

\* cited by examiner

TUBULAR ELECTRIC CABLE FITTINGS WITH STRAIN RELIEF

CROSS-REFERENCE TO RELATED APPLICATION

This patent application is the national entry of International Patent Application No. PCT/GB2012/000222, filed on Mar. 7, 2012, also entitled "Tubular Electric Cable Fittings With Strain Relief," which in turn claimed the benefit of Great Britain Patent Application No. 1104115.9, filed on Mar. 10, 2011, again entitled "Tubular Electric Cable Fittings With Strain Relief," both of which are assigned to the assignee of the present invention and both of which are hereby incorporated herein by reference in their entirety.

BACKGROUND OF THE INVENTION

Field of the Invention

The present invention relates generally to a strain relief device for protecting Tubular Electric Cable ("TEC") end portions or fittings that may be of fiber optic or electric type service, and more particularly to a strain relief device that protects end fittings from leakage and loss of circuit continuity.

In downhole control and monitoring system applications, Tubular Electric Cable ("TEC") are used as control lines and are generally routed along the wellbore tubing to access individual downhole apparatus. Most TEC control lines used in oil well applications are for power and communication means and may be of fiber optic or electric type, or any combinations thereof. In the practice of routing and running TEC control lines along a wellbore conduit, ultimate torsional and tensional loads are imposed on the cable. Moreover, stretching loads are induced during the handling and attachment of the tubular control line to the wellbore conduit as well as during the run-in or installation phase in the well. The latter is mainly due to swabbing effects as the line is squeezed between an inner wellbore conduit and an outer wellbore conduit. For those skilled in the art, the aforementioned inner and outer wellbore conduits are often referred to as the wellbore "tubing" or "completion" and the wellbore "liner" or "casing", respectively.

Loads imposed to the TEC are both torsional and tensional, and contribute to ultimate loads onto the splices and end connections, which in turn cause cable integrity failures of both short-term and long-term type. For electric and fiber optic TEC applications, the root cause of failure ultimately initiates a leak of some kind, exposing the integral wires or optic signal lines to unknown fluids from the surroundings. This in turn leads to degradation of insulation resistance of the cable, wire oxidation, and loss of optic or electric signal/power continuity. In the real world, the breakdown is usually due to leaks and is typically evident inside the TEC end-fittings and splice. The main cause is lack of sufficient strain relief between the tubular jacket and its termination fittings.

U.S. Pat. No. 7,220,067, to Rubenstein et al., provides an example of existing tubular control line applications. This application provides no strain relief to the end-fittings, terminations, or for the wiring inside, and tubular control lines such as this are subject to a variety of well-known problems, limitations, and disadvantages, as described above.

It has therefore been considered desirable to develop a strain relief assembly for TEC control lines which would readily accommodate high tensional and torsional loads. The nature of the handling, operation, and installation of apparatus in the wells normally imposes excessive loads onto the control lines. The present invention, in combination with TEC control line end fittings, terminations, or splice, reduces failure of the cables used and provides a new protective device which is simple in design, effective in use, and adapted for use in oil well applications.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

According to the present invention, there is provided a strain relief assembly for protecting one or more wires, cables, or tubular control lines, comprising a hollow tubular insulating jacket, wherein the hollow tubular insulating jacket includes an internal structural support for a wire, cable, or tubular control line.

Failures related to leaks and electrical and/or optical continuity in applications using Tubular Electric Cable ("TEC") control lines are eliminated through the use of a resilient strain relief assembly attached to the TEC end fittings and splice. The assembly may consist of a channel tubing duct or bore with a slotted section thereof. The slotted trough guides a bent or formed section of the TEC which provides strain relief for the end connection in two orthogonal planes. The strain relief is affixed to the tubing end connection (anchor fittings) and is uniquely constructed in a manner that avoids the transfer of torsional, tension, and transverse loads imposed from the TEC tubular jacket to the end connection and its internal termination. The strain relief assembly serves as a resilient, protective securing anchor for the tubular control line.

For a fiber optic or electric control application utilizing TEC type control lines, stresses imposed either by tensional or torsional loads to the cable and end connection are typically completely absorbed and neutralized within the strain relief assembly. This is mainly due to the bent configuration of the TEC and the structural support it receives inside the slotted section of the strain relief assembly. Moreover, the strain relief assembly of the present invention is designed to resiliently protect fiber-optic and electric control line end connections and their internal wiring from being pulled off or damaged. Damage to the end connections would cause a circuit discontinuity that may lead to loss of power, communications, or a combination thereof. The protection is provided as a result of the bent, twisted, or axially curved configuration as described below which locks and secures the inner wires to the cable jacket at the end section of the TEC. In this manner, tensional, transverse, and torsional forces inducing stress and strain to the internal wiring as well as the jacket will be removed in the bends and will not reach the end section where the cable or fiber is terminated. This eliminates the phenomenon of the TEC being pulled from the end wire terminations, which is a huge improvement in respect to the commodity of TEC end fitting and splices.

It will thus be appreciated that it would be desirable to provide a strain relief assembly for protecting one or more wires, cables, or tubular control lines, comprising: a hollow tubular insulating jacket, wherein the hollow tubular insulating jacket comprises: an internal structural support for a wire, cable, or tubular control line.

It would also be desirable that it would be desirable to provide a strain relief assembly for protecting one or more wires, cables, or tubular control lines, comprising:

It would further be desirable that it would be desirable to provide a method protecting one or more wires, cables, or tubular control lines, comprising: an elongated hollow tubular insulating member having a receiving aperture located at a first end thereof and an end fitting aperture located at a second end thereof, the tubular insulating member having an internal structural support for a portion of a wire, cable, or tubular control line extending through the receiving aperture at the first end of the tubular insulating member and into the end fitting aperture at the second end of the tubular insulating member; wherein the internal structural support is arranged and configured to receive a wire, cable, or tubular control line therein in a nonlinear configuration to prevent torsional, transverse, or tensional forces from being transferred from the wire, cable, or tubular control line outside the strain relief assembly to the portion of a wire, cable, or tubular control line at the end fitting aperture at the second end of the tubular insulating member.

BRIEF DESCRIPTION OF THE DRAWINGS

These and other advantages of the present invention are best understood with reference to the drawings, in which.

DETAILED DESCRIPTION OF THE PREFERRED EMBODIMENT

Figure 1:
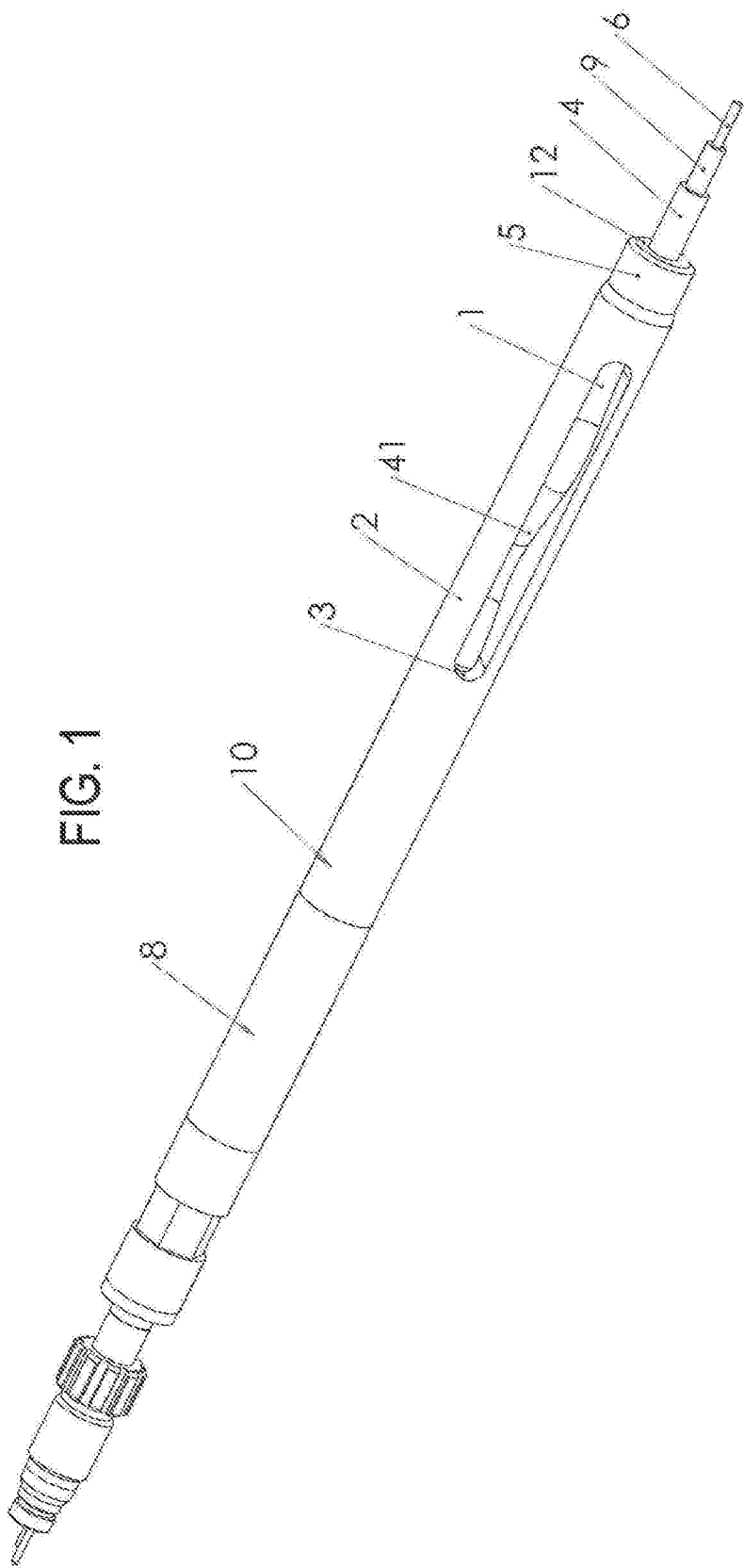
FIG. 1 is a perspective view of the present invention.
Figure 2:
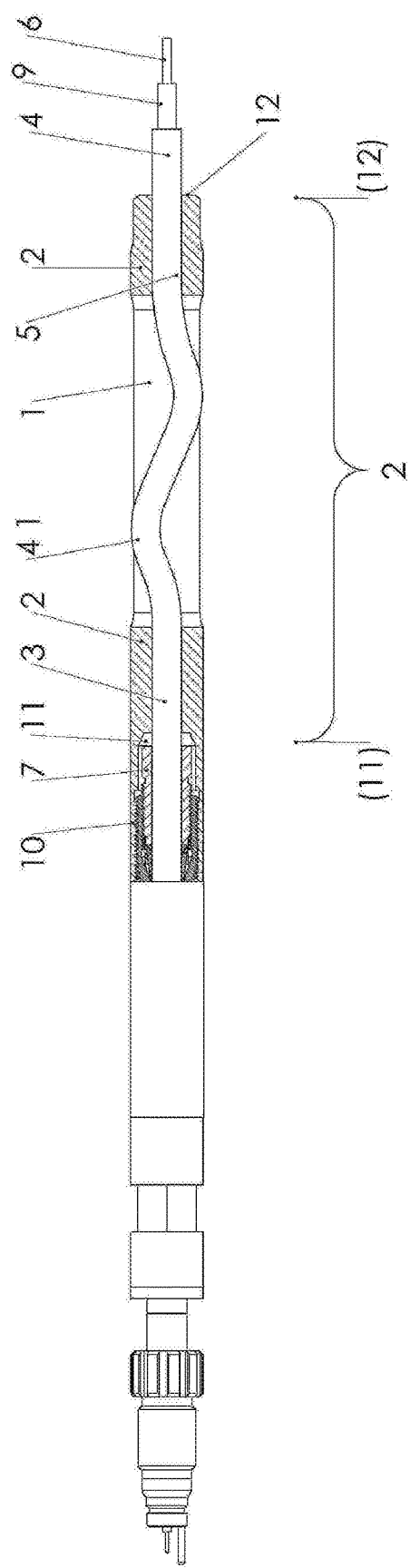
FIG. 2 is a cross-sectional view of the present invention.
Figure 3:
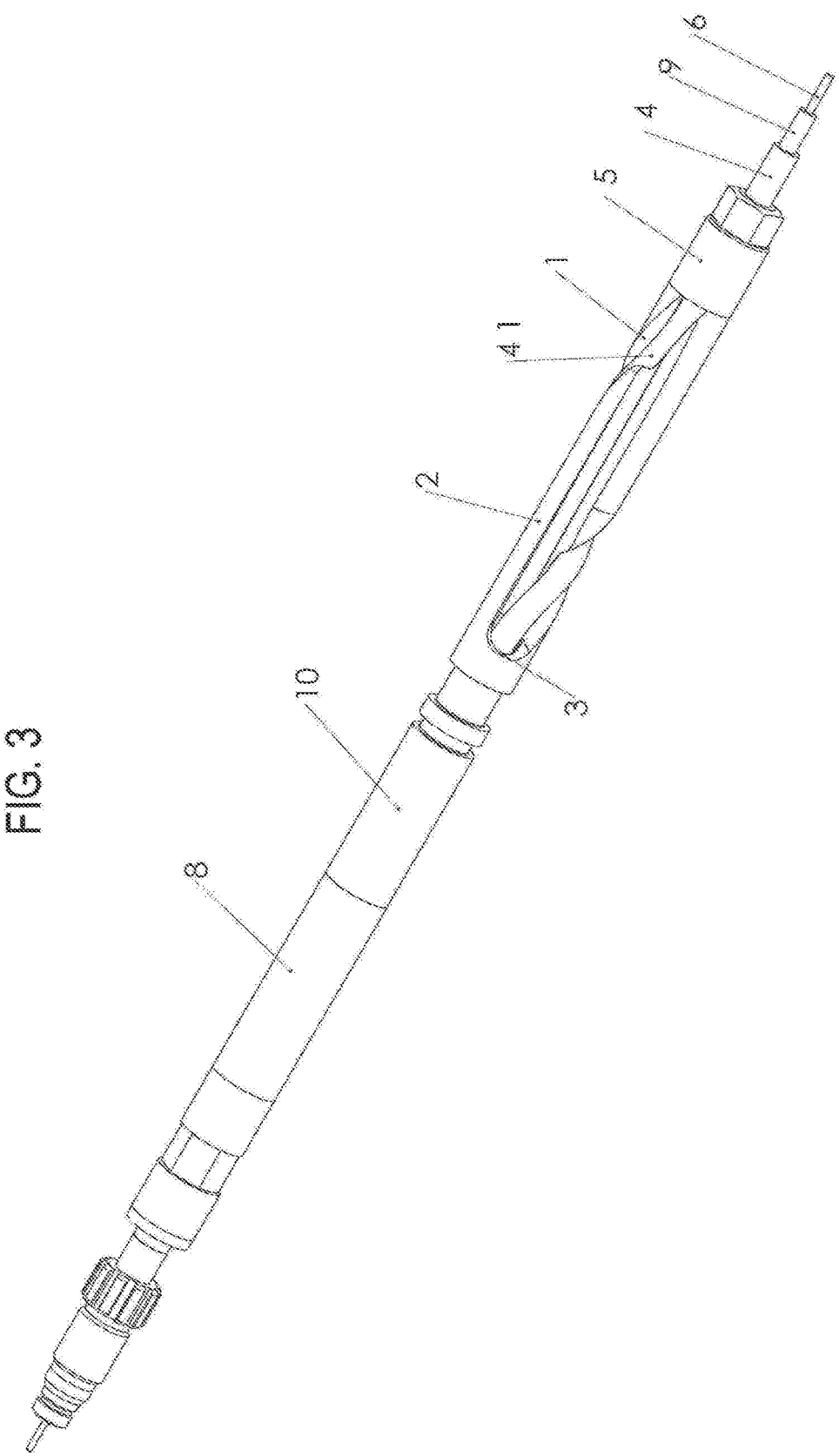
FIG. 3 is a perspective view of an alternative embodiment of the present invention.
Figure 4:
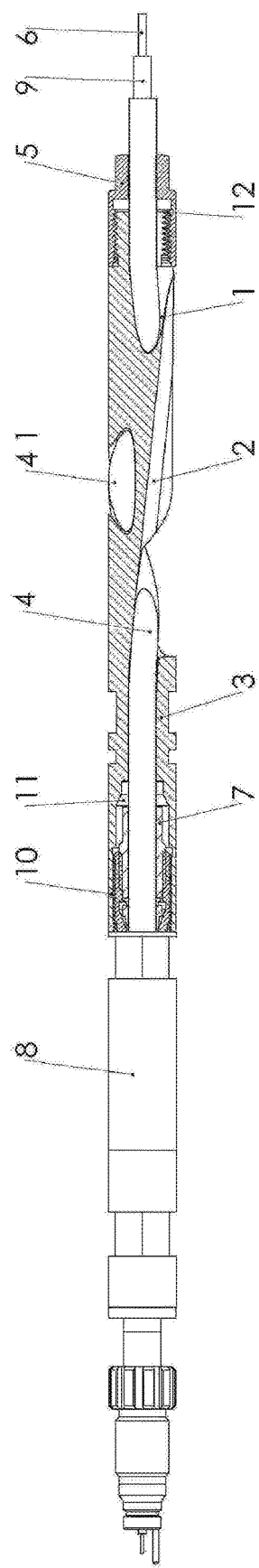
FIG. 4 is a cross-sectional view of an alternative embodiment of the present invention.

Referring to FIGS. 1, 2, 3, and 4, a strain relief assembly 2 includes a connection 10, an end fitting aperture 3, a tubing duct 1, and a receiving aperture 5. Referring specifically to FIGS. 2 and 4, the channel exit section of the end fitting aperture 3 defines the "exit" 11, and the entrance of the receiving aperture 5 defines the "entrance" end of the strain relief assembly 2. In turn, at the exit end 11, the end fitting aperture 3 is advantageously sized to receive and protect the end termination of the Tubular Electric Cable ("TEC") 4. The tubing duct 1 extends from the exit of the receiving aperture 5 to the entrance of the end fitting aperture 3 and lies in one or two orthogonal planes. A connection 10 attaches the strain relief assembly 2 to an anchor fittings 8 in a way that prevents rotation of the strain relief assembly 2 and the end fitting 7 relative to the anchor fittings 8. The end fitting 7 provides both a mechanical attachment and a seal with the jacket of the TEC 4, thus avoiding leaks to the interior of the anchor fittings 8.

To prevent the rotational and axial load from the end of the TEC 4 control line being transferred to the end fittings 7, the TEC 4 is formed into a bent configuration 41 inside the tubing duct 1. The combination of the bent configuration 41 inside the tubing duct 1 defines the stress and strain relief section of the strain relief assembly 2. The strain relief assembly 2 can be made inexpensively in a suitable material to comply with the anchor fittings 8 and the TEC 4, and provides stress and strain relief in order to protect the end terminations of the TEC 4. The stress and strain relief includes relief from axial and torsional loads which are some of the most frequent causes of leaks and circuit discontinuity in most downhole tubular control line applications.

The bent configuration 41 resiliently protects an internal wiring (or fiber optic cable) 6 and a cable insulating jacket 9 from moving inside the TEC 4. This is achieved through the creation of an internal friction-lock of the internal wiring 6 and the insulating jacket 9, eliminating the stress and strain applied to the internal wiring 6, which may otherwise pull off, unscrew, or damage the connections attached at the end of the cables.

Referring to FIGS. 3 and 4 of this invention particularly, these drawings show an alternative embodiment of the present invention to that provided in FIGS. 1 and 2, with identical reference numerals being used to depict identical components. Instead of a straight-through tubing duct 1, as shown in FIGS. 1 and 2, this derivative strain relief assembly 2 has a three-dimensional axially curved tubing duct 1. The tubing duct 1 screws over the mid-section of the strain relief assembly 2 to prevent tension and rotation of the end fitting 7 after mounting. Due to the nature of the twisted tubing duct 1, this embodiment is designed to ease the installation and stress/strain relief of the TEC 4 control line and end fittings 7, as no special tool is required to form or bend the TEC 4 inside the tubing duct 1. The twisted section easily guides the TEC 4 through one or two 90 degree or more curves lying in two orthogonal planes. The forming and placement of the TEC 4 into the tubing duct 2 may be easily done by hand and without the use of special tools.

Further, the use of one or two coincident curves along the axis of the unit significantly reduces the TEC 4 routing space and firmly secures the internal wiring 6 within the strain relief assembly at the same time as it provides the optimum stress/strain protection of the end fittings 7. As with the embodiment described with reference to FIGS. 1 and 2, a twisted or axially curved configuration 41 of this embodiment resiliently protects the internal wiring (or fiber optic cable) 6 and the cable insulating jacket 9 from moving inside the TEC 4. This is achieved through the creation of an internal friction-lock of the internal wiring 6 and the cable insulating jacket 9, eliminating the stress and strain applied to the internal wiring 6, which may otherwise pull off unscrew or damage the connections attached at the end of the cables.

The mounting of the receiving aperture 5 resiliently secures the line and requires no additional ties, straps, or clamps to hold the TEC 4 within the strain relief assembly 2. Therefore, the second embodiment provides overall protection towards tensional and torsional loads both to the TEC 4 control line end as well as to the strain relief assembly 2.

Figure 5:
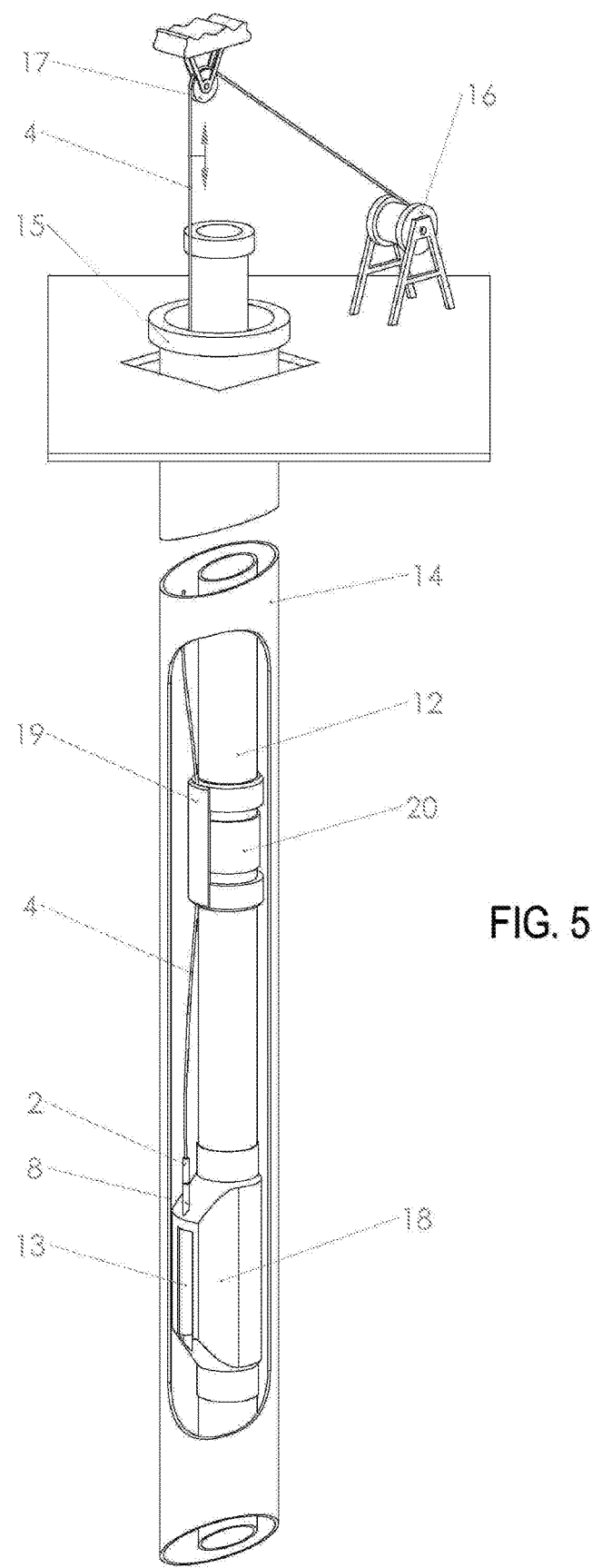
FIG. 5 is an illustration showing the service of the present invention.

FIG. 5 illustrates an oil well application and a typical service for the present invention. In the illustration the TEC 4 control line and strain relief assembly 2 is attached to a downhole instrument 13. Further, the downhole instrument 13 is part of an instrument carrier 18, both of which are mounted to an inner wellbore conduit 12. In turn, the inner wellbore conduit 12 is fed into a wellbore 15 having an outer wellbore conduit 14. The TEC 4 is maintained and controlled from a winch 16. To freely enter the wellbore 15 the TEC 4 is run through an overhanging sheave wheel 17. However, it is important that the TEC 4 control line is securely and resiliently fixed to the inner wellbore conduit 12 to avoid constrictions and entanglements as it is fed into the wellbore 15. To avoid possible constrictions and entanglements, the TEC 4 is highly stretched by force or braking of the winch 16 and consecutively clamped using control line clamps 19. Typically, the control line clamps 19 are attached to each tubing collar 20 of the inner wellbore conduit 12 as the tubing assembly is lowered into the wellbore 15. Thus, it is seen that the TEC 4 and its end portions should be capable of resisting the ultimate stress and strain from the mounting and installation process. For those skilled in the art, it will be appreciated that this handling can cause failure and fatalities to the TEC 4, and it is expected that those skilled in the art will appreciate and encourage the use of this new protective device.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A strain relief assembly for protecting a tubular electric cable in a wellbore, the assembly comprising:
    an elongated, hollow, tubular member formed along a primary axis, the tubular member having a first end and a second end;
    a cable extending through the tubular member between the first and second ends; and
    a structural support supporting the cable between the first and second ends, the structural support comprising a slot formed in an exterior surface of a wall of the tubular member that partially extends along the primary axis, wherein at least a portion of the cable is movable along the slot;
    wherein one or more portions of a path of the cable is obliquely arranged relative to the primary axis.

2. The strain relief assembly of claim 1, wherein the structural support comprises two longitudinally extending slots formed in the wall of the tubular member.

3. The strain relief assembly of claim 1, wherein the structural support comprises a helical slot formed in the wall of the tubular member.

4. The strain relief assembly of claim 1, further comprising a first resilient end disposed in the first end of the tubular member, the first resilient end having an aperture therein; and a second end fitting disposed in the second end of the tubular member, the second end fitting having an aperture therein; wherein the cable passes through the first resilient end aperture and the second end fitting aperture and is maintained by the first resilient end and the second end fitting so as to cause the cable to extend toward the slot.

5. The strain relief assembly of claim 1, wherein the cable extends into the slot and is guided by the slot.

6. A strain relief assembly for protecting a tubular electric cable in a wellbore, the assembly comprising:
    an elongated, hollow, tubular member formed along a primary axis, the tubular member having a first end and a second end;
    a cable extending through the tubular member between the first and second ends; and
    a structural support supporting the cable between the first and second ends, the structural support comprising non-linear tubing and a slot formed in an exterior surface of a wall of the tubular member that partially extends along the primary axis, wherein the cable passes through the non-linear tubing;
    wherein one or more portions of a path of the non-linear tubing is obliquely arranged relative to the primary axis.

7. The strain relief assembly of claim 6, wherein the nonlinear tubing forms a path for the cable extending therethrough, wherein the path forms a non-linear shape selected from the group consisting of a bent path, a twisted path and an axially curved path.

8. The strain relief assembly of claim 6, further comprising a first resilient end disposed in the first end of the tubular member, the first resilient end having an aperture therein; and a second end fitting disposed in the second end of the tubular member, the second end fitting having an aperture therein; wherein the cable passes through the first resilient end aperture and the second end fitting aperture and is maintained by the first resilient end and the second end fitting.

9. The strain relief assembly of claim 6, wherein a portion of the nonlinear tubing extends into the slot and is guided by the slot.

10. A strain relief assembly for protecting a tubular electric cable in a wellbore, the assembly comprising:
    an elongated, hollow, tubular member formed along a primary axis, the tubular member having a first end and a second end;
    a first resilient end disposed in the first end of the tubular member, the first resilient end having an aperture therein;
    a second end fitting disposed in the second end of the tubular member, the second end fitting having an aperture therein;
    a structural support supporting the cable between the first and second ends, the structural support comprising a slot formed in an exterior surface of a wall of the tubular member that partially extends along the primary axis; and
    a cable passing through the first resilient end aperture and the second end fitting aperture and extending through the tubular member between the two ends;
    wherein the cable is secured by the first resilient end and the second end fitting so as to have a non-linear path between the first and second ends of the tubular member;
    wherein the non-linear path is curved ninety degrees or more;
    wherein one or more portions of the non-linear path is obliquely arranged relative to the primary axis.

11. The strain relief assembly of claim 10, wherein the non-linear path further includes at least one of a bent path, a twisted path and an axially curved path.

12. The strain relief assembly of claim 6, wherein the non-linear tubing may be curved ninety degrees or more.

* * * * *